United States Patent
Kesanupalli et al.

(10) Patent No.: US 11,949,689 B2
(45) Date of Patent: Apr. 2, 2024

(54) UNIFIED AUTHENTICATION SYSTEM FOR DECENTRALIZED IDENTITY PLATFORMS

(71) Applicant: ADI Association, Santa Clara, CA (US)

(72) Inventors: Ramesh Kesanupalli, San Jose, CA (US); Soonhyung Lee, Seoul (KR); Changsoo Kim, San Jose, CA (US); Mark Chen, Newark, CA (US); Jason S. Burnett, San Jose, CA (US); Kiran Pandurang Addepalli, Raleigh, NC (US)

(73) Assignee: ADI Association, Santa Clara, CA (US)

( * ) Notice: Subject to any disclaimer, the term of this patent is extended or adjusted under 35 U.S.C. 154(b) by 299 days.

(21) Appl. No.: 16/990,328

(22) Filed: Aug. 11, 2020

(65) Prior Publication Data

US 2021/0051159 A1 Feb. 18, 2021

Related U.S. Application Data

(60) Provisional application No. 62/886,247, filed on Aug. 13, 2019.

(51) Int. Cl.
*H04L 9/40* (2022.01)
(52) U.S. Cl.
CPC ........ *H04L 63/126* (2013.01); *H04L 63/0861* (2013.01); *H04L 63/101* (2013.01); *H04L 63/102* (2013.01)
(58) Field of Classification Search
CPC . H04L 63/126; H04L 63/0861; H04L 63/101; H04L 63/102
See application file for complete search history.

(56) References Cited

U.S. PATENT DOCUMENTS

| 10,637,665 | B1* | 4/2020 | Sundaresan | ........... H04L 63/083 |
| 2011/0072039 | A1* | 3/2011 | Tayloe | ..................... G06F 21/62 |
| | | | | 707/769 |
| 2014/0303999 | A1 | 10/2014 | Efros | |
| 2018/0173871 | A1* | 6/2018 | Toth | ..................... H04W 12/126 |

(Continued)

FOREIGN PATENT DOCUMENTS

| JP | 2001141477 | 5/2001 |
| JP | 2003208407 | 7/2003 |

(Continued)

OTHER PUBLICATIONS

Aadhaar: "What is Aadhaar KYC? Know e-KYC , for Aadhaar card", Jun. 18, 2019 (Jun. 18, 2019), XP093056034, Retrieved from the Internet: URL: https://uidai.gov.in/images/news/Whatis-Aadhaar-KYC-Know-e-KYC-for-Aadhaar-card.pdf [retrieved on Jun. 20, 2023].

(Continued)

*Primary Examiner* — Harris C Wang
(74) *Attorney, Agent, or Firm* — Van Pelt, Yi & James LLP (57) ABSTRACT

A unified authentication system for decentralized identity platforms is disclosed. In various embodiments, a request comprising one or more identity claims and a digital address is received. The digital address is used to verify, via a verification node associated with a digital address provider, the one or more identity claims. Access to a service is provided, in response to the request, based at least in part on a response from the verification node indicating the one or more identity claims have been verified. The verification node is configured to obtain consent, in real time, from a user with which the digital address is associated, prior to providing said response indicating the one or more identity claims have been verified.

10 Claims, 8 Drawing Sheets

(56) References Cited

U.S. PATENT DOCUMENTS

| | | | |
|---|---|---|---|
| 2018/0270065 A1 | 9/2018 | Brown | |
| 2019/0116188 A1 | 4/2019 | Praszczalek | |
| 2019/0207951 A1 | 7/2019 | Oberhauser | |
| 2019/0349372 A1* | 11/2019 | Smith | G06F 21/31 |
| 2021/0051159 A1* | 2/2021 | Kesanupalli | H04L 63/101 |
| 2021/0377263 A1* | 12/2021 | Law | G06F 21/32 |

FOREIGN PATENT DOCUMENTS

| | | |
|---|---|---|
| JP | 2007534085 | 11/2007 |
| JP | 2009181561 | 8/2009 |
| JP | 2011508332 | 3/2011 |
| JP | 2012208554 | 10/2012 |
| KR | 20180108566 | 10/2018 |
| KR | 20180133944 | 12/2018 |

OTHER PUBLICATIONS

Anonymous: "education/introduction-to-hyperledger-indy.md at ebeac1cf6e31f218674038fd0eeb93d4b63f99edhyperledger-archives/education GitHub", Oct. 18, 2018 (Oct. 18, 2018), XP055697898, Retrieved from the Internet: URL: https://github.com/hyperledger-archives/education/blob/ebeac1cf6e31f218674038fd0eeb93d4b63f99ed/LFS171x/docs/introductionto-hyperledger-indy.md [retrieved on May 25, 2020].

Sporny et al.: "Verifiable Credentials Data Model 1.0", Mar. 28, 2019 (Mar. 28, 2019), XP055701327, Retrieved from the Internet: URL: https://www.w3.org/TR/2019/CR-verifiable-claims-data-model-20190328/#sharing-information-with-the-wrong-party [retrieved on Jun. 4, 2020].

Takemiya et al: "Sora Identity: Secure, Digital Identity on the Blockchain", 2017 IEEE 41ST Annual Computer Software and Applications Conference (COMPSAC), IEEE, vol. 2, Jul. 23, 2018 (Jul. 23, 2018), pp. 582-587, XP033409765, ISSN: 0730-3157, DOI: 10.1109/COMPSAC.2018.10299 ISBN: 978-1-5386-2667-2 [retrieved on Jun. 8, 2018].

Willeke De Rooij: "Verifiable Claims for Digital identity", VX Company, Aug. 10, 2018 (Aug. 10, 2018), pp. 1-8, XP055822490, Retrieved from the Internet: URL: https://vxcompany.com/insight/verifiable-claims-for-digital-identity/ [retrieved on Jul. 8, 2021].

* cited by examiner

UNIFIED AUTHENTICATION SYSTEM FOR DECENTRALIZED IDENTITY PLATFORMS

CROSS REFERENCE TO OTHER APPLICATIONS

This application claims priority to U.S. Provisional Patent Application No. 62/886,247 entitled UNIFIED AUTHENTICATION SYSTEM FOR DECENTRALIZED IDENTITY PLATFORMS filed Aug. 13, 2019 which is incorporated herein by reference for all purposes.

BACKGROUND OF THE INVENTION

With the convergence of the physical world and online or "cyber" worlds (via the Internet and other cloud-connected technologies), it has become more critical than ever to provide an infrastructure and system to enable trustable, accountable, and secure human-cyber identities for use online.

Many attempts to provide this type of system have been proposed, but each of them attempts to symptomatically solve what is a more fundamental problem—current incarnations of Cyber Identity are clone-able, subject to identity theft, and are inherently untrustworthy because of that.

In response to this, a backlash of government regulations and corporate policies have tried to solve the identity theft symptom by creating greater requirements for privacy and control over identity data, but they do not solve the root problem. Attempts to accommodate these requirements or policies have resulted in replacing one flawed system with a new version of the same flawed system. These attempts have resulted in fragmented, multi-viewpoint, technical-oriented approaches, organizations and working groups which apply better technology but with the same philosophy that ultimately does not solve the root problem.

It is right and necessary to ensure both privacy and security of identity data but also ensure that Cyber Identity can be trustable and accountable online, just as offline identity can be trustable and accountable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A unified, decentralized identification and authentication system is disclosed. In various embodiments, a system as disclosed herein includes devices and protocols that perform secure registration, issuance, storage, and verification of digital credentials bound to unique human identities. The unique binding of a digital credential to a human identity is enforceable at registration time across mutually independent credential issuers, so long as those issuers cooperate with a repository of identity disambiguation information as disclosed herein. In various embodiments, a previously registered human user attempting to register with any (arbitrary) credential issuer will be known or discovered by the issuer to be the owner of an already issued credential. In various embodiments, the system prevents the issuance of multiple credentials to a single user.

Figure 1:
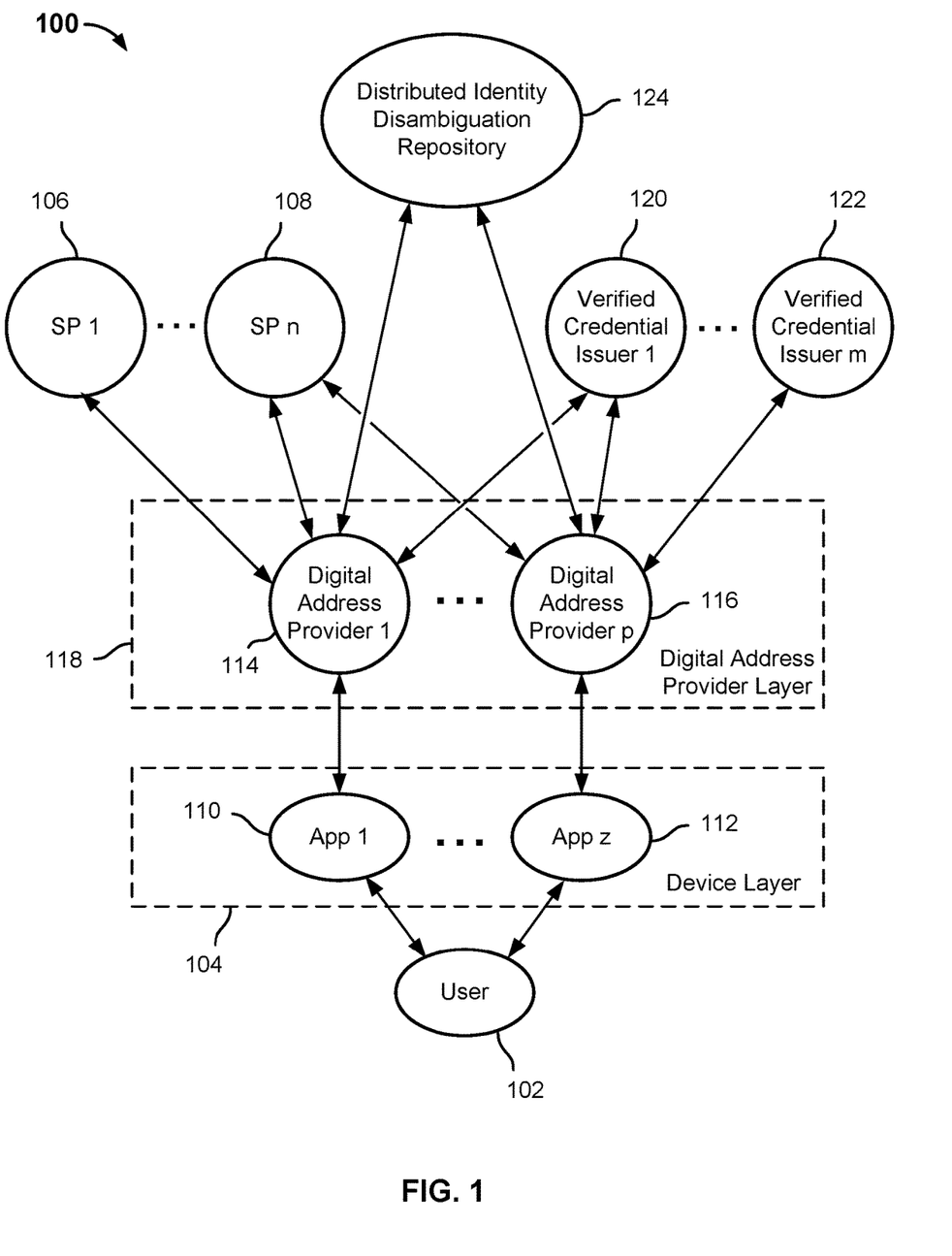
FIG. 1 is a block diagram illustrating an embodiment of a unified authentication system for decentralized identity platforms.

FIG. 1 is a block diagram illustrating an embodiment of a unified authentication system for decentralized identity platforms. In the example shown, the system 100 enables a user 102 of a device 104, such as a mobile device, laptop computer, desktop computer, or other device trusted by user 102, to obtain a digital address or other digital identity and/or credential to be used to access services from service providers such as service providers 106, 108. In the example shown, the user 102 uses a selected digital identity app 110, 112 on device 104 to obtain a digital address or other digital identity or credential as disclosed herein. The digital identity app 110, 112 interacts with an associated digital address provider (or other digital identity provider) 114, 116 comprising a digital address provider layer 118. Examples of a digital address provider 114, 116 include, without limitation, decentralized credential providers such as CIVIC, SOVRIN, EVERNYM, or other providers.

In the example shown, the digital address provider 114, 116 may interact with a verified credential issuer 120, 122, e.g., to verify information extracted from documents or entered via device 104 in connection with digital address self-registration (e.g., as described below) and/or to facilitate access to verifiable credentials provided by issuers 120, 122, such as to provide secure access to a service to a user with whom a previously-issued digital address has been issued. In various embodiments, a verified credential issuer 120, 122 facilitates higher-assurance digital identity credentials to be created. Examples of a verified credential issuer 120, 122 include, without limitation, a bank or other financial institution; a government agency such as the Department of Motor Vehicles, the State Department, the Department of Homeland Security, the Internal Revenue Service, and other agencies; healthcare providers and insurers; credit reporting bureaus; and any entity having unique, special, and/or privileged access to information, personnel, processes, and expertise to verify identity information.

In various embodiments, to register a digital address, a digital address provider such as digital address provider 114, 116 receives from an associated digital identity app 110, 112 an identity disambiguation data, sometimes referred to herein as an "identity disambiguator". In various embodiments, an identity disambiguator comprises a value uniquely associated with a single human user. No other human user would have or produce the same value for the identity disambiguator, and each human is capable of generating only the one identity disambiguator that is unique to that human.

In various embodiments, the digital address provider 114, 116 checks a distributed identity disambiguation repository 124 to verify the identity disambiguator has not been used previously to issue a digital address. The distributed identity disambiguation repository 124 may comprise any accessible storage medium, such as a public blockchain or a local database.

In various embodiments, the distributed identity disambiguation repository 124 sits one layer above the prior typical decentralized identity efforts layer. In some embodiments, the distributed identity disambiguation repository 124 works for decentralized identity in much the way ICANN/DNS works for website addresses. The distributed identity disambiguation repository 124 prevents a person from registering more than one identity disamiguator and allows for interoperability and clearing among various digital address providers 114, 116 without requiring any disclosure of the user's personal information, including biometric information.

In various embodiments, the distributed identity disambiguation repository 124 comprises a database that may be implemented using a blockchain or other distributed ledger and/or distributed database technology. In various embodiments, regardless of implementing technology the distributed identity disambiguation repository 124 database has multiple nodes operated by various participating organizations.

In various embodiments, the distributed identity disambiguation repository 124 operates as disclosed herein to ensure that each human user has no more than one digital address. In some embodiments, it does this by employing its own uniquely formatted DID-like locator, e.g., an "identity disambiguator" as disclosed herein. In some embodiments, the identity disambiguator is combined with addressing information to generate and provide a digital address that may be used to identify and is uniquely associated with the one human user with whom the identity disambiguator is uniquely associated.

In various embodiments, an identity disambiguator as disclosed herein is derived from a group of data or other attributes considered to be unique to one human user. An identity disambiguator in various embodiments can be reproduced any number of times to produce for a given human user the same identity disambiguator and no other, so that each human user can obtain through registration only one digital address and only that human user can obtain that digital address, since the human user can produce only one identity disambiguator and no other human user can produce that same identity disambiguator.

In various embodiments, an identity disambiguator as disclosed herein is derived deterministically from the user's quantized biometric data and (in some embodiments) an identity registry salt, but reveals no information regarding the biometric data. In some embodiments, the identity registry salt comprises a single global value shared among digital address providers 114, 116, 118 and the distributed identity disambiguation repository 124. In some embodiments, the identity registry salt is cryptographically combined with quantized biometric data through a one-way function to produce the identity disambiguator. In some embodiments, the value of the identity registry salt is not secret.

In various embodiments, the arrows showing interactions between entities in FIG. 1 represent communications sent using a Common API, such as a standards-based API. In some embodiments, the Common API takes the place of existing proprietary APIs used by the disparate existing credential issuers and related entities. In some other embodiments, proprietary APIs continue to be used. For example, proprietary APIs may be used by some subset of digital identity apps 110, 112 and digital address providers 114, 116. Such proprietary APIs may be published or otherwise made available to entities participating in the system 100, for example.

Figure 2:
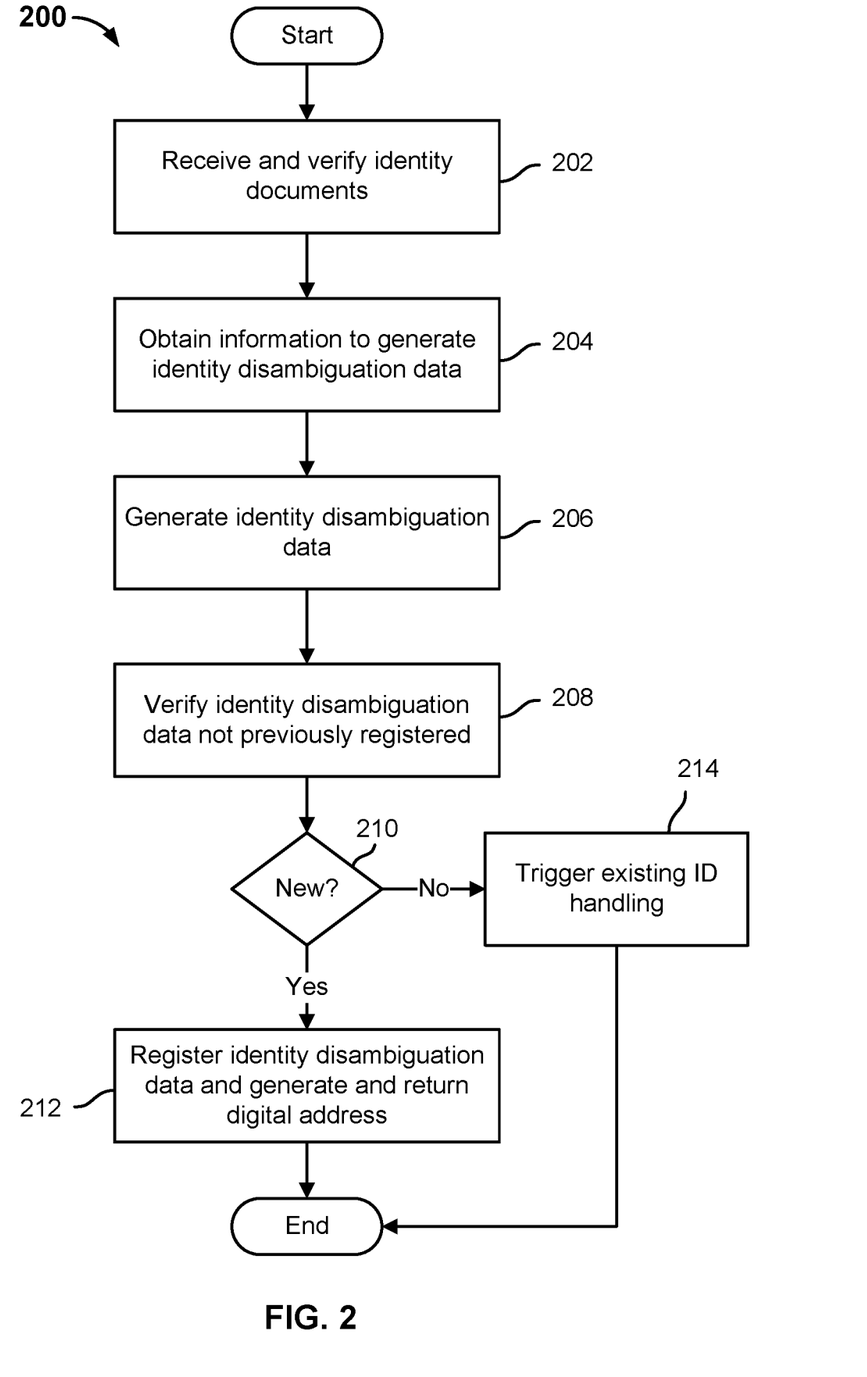
FIG. 2 is a flow diagram illustrating an embodiment of a process to issue a digital credential.

FIG. 2 is a flow diagram illustrating an embodiment of a process to issue a digital credential. In various embodiments, the process 200 of FIG. 2 is performed by a digital address provider, such as digital address providers 114, 116 of FIG. 1. In the example shown, at 202 identity documents are received and verified. In various embodiments, a user, such as user 102 of FIG. 1, may use a digital app (e.g., 110, 112) running on a user device (e.g., 104) to take photos or other images (e.g., PDF) of identity documents. The app may perform optical character recognition (OCR) or other processing to extract identity information from the documents and provide the information to the digital address provider. In some embodiments, the app may send the image or other representation of the entire document(s) to the digital address provider.

At 204, information to generate identity disambiguation data is obtained. In some embodiments, an app and user device may be used to obtain biometric information, such a facial recognition, fingerprint, or voice (e.g., spoken standard phrase) data. In some embodiments, a biometric scanner provided by and/or otherwise trusted by a digital identity provider may be used, e.g., a scanner that is plugged into or otherwise connected to a user device of the user. In some embodiments, biometric data is not required, obtained, or used to register a digital address. Instead, other information that is not biometric data but is (sufficiently likely to be) unique to one human person, such as an array of values that includes one or more of biographical information (date of birth, city of birth), a numeric or alphanumeric identifier issued by the government or other authority (e.g., social security number), and/or other data may be used to generate identity disambiguation data as disclosed herein.

At 206, the data received at 204 is used to generate identity disambiguation data, i.e., an identity disambiguator, as disclosed herein. In various embodiments, the identity disambiguator is generated by the digital identity app running on the user's device, which avoids having the data used to generate the identity disambiguator being sent to the digital address provider. Since the user's biometric and/or other information cannot be discerned from the identity disambiguator, this approach may be considered more private and/or secure.

At 208, the digital address provider verifies the identity disambiguator has not been registered previously. For example, the digital address provider may access a distributed identity disambiguation repository, such as distributed identity disambiguation repository 124 of FIG. 1, to determine whether the identity disambiguator has been used previously to obtain a digital address. If at 210 it is determined that the identity disambiguator has not been used previously to obtain a digital address, then at 212 the digital address provider registers the identity disambiguator by storing a corresponding record in the distributed identity disambiguation repository and generates and returns to the user (e.g., via the digital identity app or other user interface) a digital address for the user.

If it is determined at 210 that the identity disambiguator has been used previously to obtain a digital address, then at 214 an existing address/identity exception handling process is triggered. For example, the digital address provider may return a response indicating the process has failed because the user has already obtained a digital address. The response may include instructions to "recover" the digital address, if the user has lost the digital address and/or information needed to reference or otherwise use it. A credential, address, or other information based on and/or associated with the previously-registered identity may be generated and/or provided.

Various techniques and processes may be provided for and/or used to obtain a digital address, in various embodiments, including without limitation self-registration, e.g., using a digital identity app running on a user-trusted device; in person registration, e.g., by presenting oneself and identity documents at a physical location, such as an office of a verified credential issuers; and augmented self-registration, e.g. using a digital address provider-trusted biometric scanning device, such as one that plugs into a USB of or otherwise connects to a user device used to register.

Figure 3:
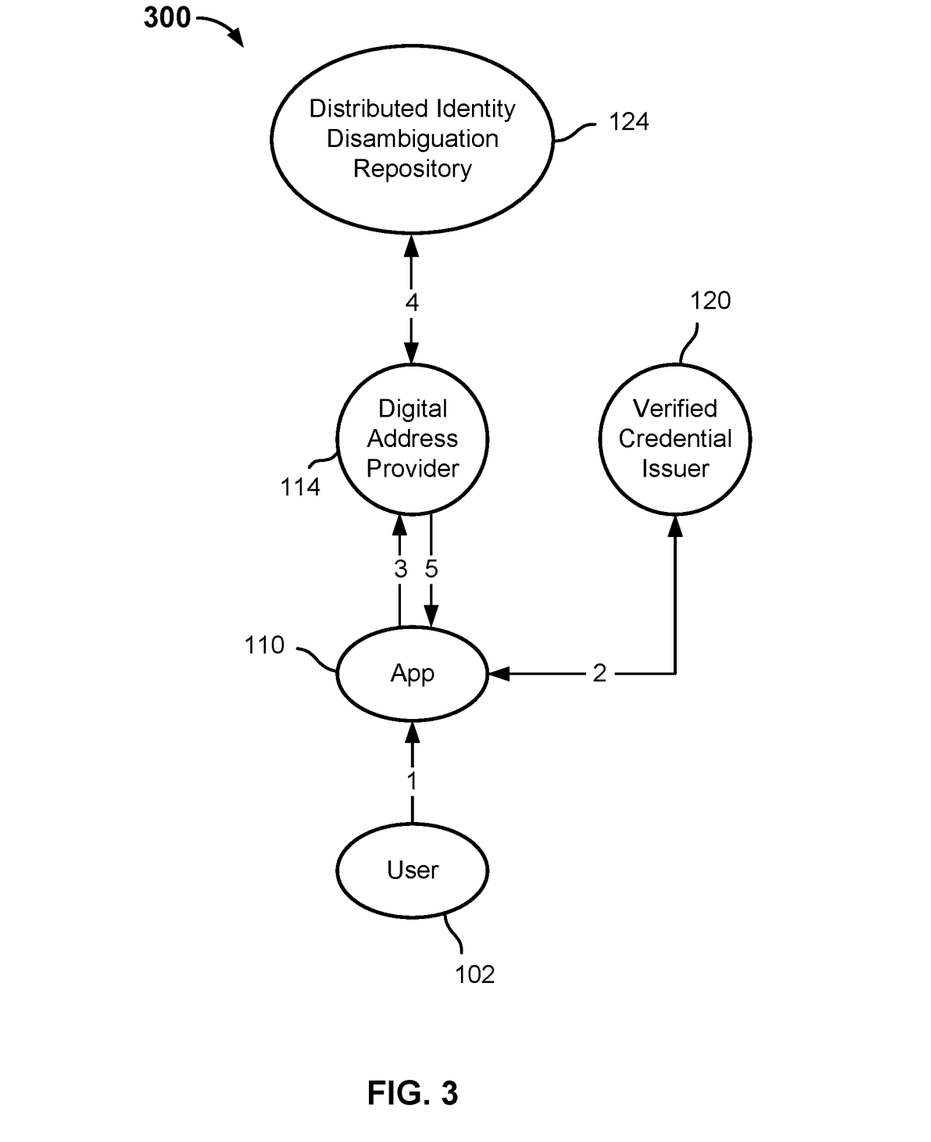
FIG. 3 is a functional flow block diagram illustrating an embodiment of a process to obtain a digital address.

FIG. 3 is a functional flow block diagram illustrating an embodiment of a process to obtain a digital address. In the example shown in FIG. 3, the process 300 enables the user 102 to obtain a digital address through a self-registration process via a digital identity app 110 running on a secure user device, e.g., a device capable of storing private PKI keys.

The user downloads the digital identity app 110, e.g., from digital address provider 114, launches the app, and initiates the process. The app may prompt the user to take images or and/or otherwise upload identity documents, e.g., driver's license, passport, other identity documents, etc., including in some embodiments a photo of the user, as represented by the arrow labeled "1" in FIG. 3. The app 110 extracts personal data from the documents and/or photo. The app 110 may perform a biometric scan of the user. In some embodiments, the biometric scan information is used to verify the user against the identifying documents, e.g., compare the live face with the face in the ID picture, compare live biometric against a machine-readable representation of the same biometric embedded in the identifying document or in another data source, etc. If the comparison fails, the transaction is terminated. If the comparison passes, the app deterministically quantizes all or a subset of the biometric information, via a repeatable function such as a fuzzy extractor and optionally combined with identity repository salt, as described above, by means of a pseudo-random, one-way transform (such as a cryptographic hash function) to produce the identity disambiguator.

If the example shown, the app 110 verifies via communications with one or more verified credential issuers (arrow "2") all or some of the personal data extracted from the documents and/or photo. In some alternative embodiments, the digital address provider 114 performs this check. For example, the Department of Motor Vehicles may be queried to verify that a submitted driver's license is valid and that the name, address, date of birth, photo, and other information extracted from the driver's license by the app 110 (or digital address provider 114) matches information in the verified credential issuer's records.

Referring further to FIG. 3, in the example shown, the app 110 provides to the digital address provider 114 (arrow "3") data extracted from the documents and/or photo provided by the user (and/or the documents and/or photo themselves) and the identity disambiguator computed by the app 110, e.g., based on biometric or other information obtained by the app 110 from the user 102.

The digital address provider 114 checks the distributed identity disambiguation repository 124 (arrow "4") to verify the identity disambiguator has not been registered previously. If not, the digital address provider 114 uses the identity disambiguator to generate a digital address for the user, which is returned to the user (arrow "5") via the digital identity app 110. If the digital address provider 114 determines via the distributed identity disambiguation repository 124 that the identity disambiguator has been registered previously, the response (arrow "5") indicates the registration process failed and, in some embodiments, provides instructions to recover the digital address registered by the user previously.

Figure 4:
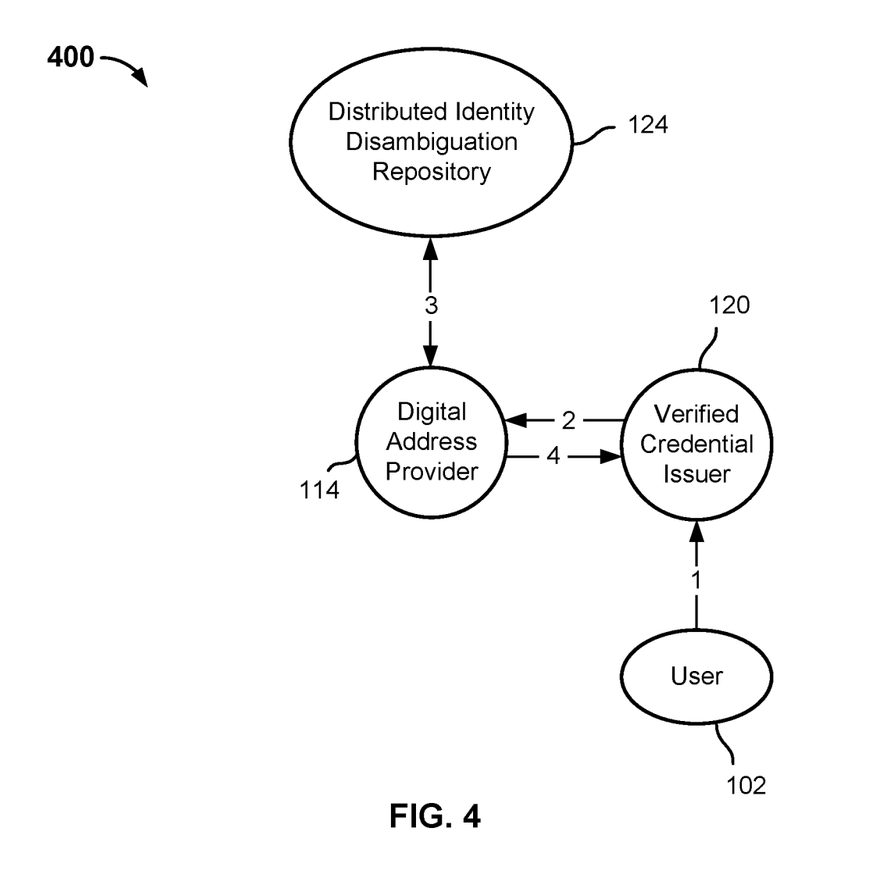
FIG. 4 is a functional flow block diagram illustrating an embodiment of a process to issue a digital address.

FIG. 4 is a functional flow block diagram illustrating an embodiment of a process to issue a digital address. In various embodiments, the process 400 of FIG. 4 may be used to register (i.e., obtain a digital address) in person, e.g., by the user 102 going to a physical location associated with a verified credential issuer 120 (arrow "1"), such as a bank, Department of Motor Vehicles office, or other location. At the physical location, a worker, kiosk, etc. obtains and verifies identity document and biometric information from the user 102 and provides extracted information, e.g., via an encrypted communication and/or channel, to the digital address provider 114 (arrow "2").

In some embodiments, the verified credential issuer 120 generates the identity disambiguator and provides the generated identity disambiguator to the digital address provider 114 (arrow "2"). In some alternative embodiments, the verified credential issuer 120 send biometric and/or other information to the digital address provider 114 (arrow "2"), which generates the identity disambiguator.

The digital address provider 114 checks the distributed identity disambiguation repository 124 (arrow "3") to verify the identity disambiguator has not been registered previously. If not, the digital address provider 114 uses the identity disambiguator to generate a digital address for the user, which is returned to the user via the verified credential issuer 120 (arrow "4"). If the digital address provider 114 determines via the distributed identity disambiguation repository 124 that the identity disambiguator has been registered previously, the response (arrow "4") indicates the registration process failed and, in some embodiments, provides instructions to recover the digital address registered by the user previously.

Figure 5:
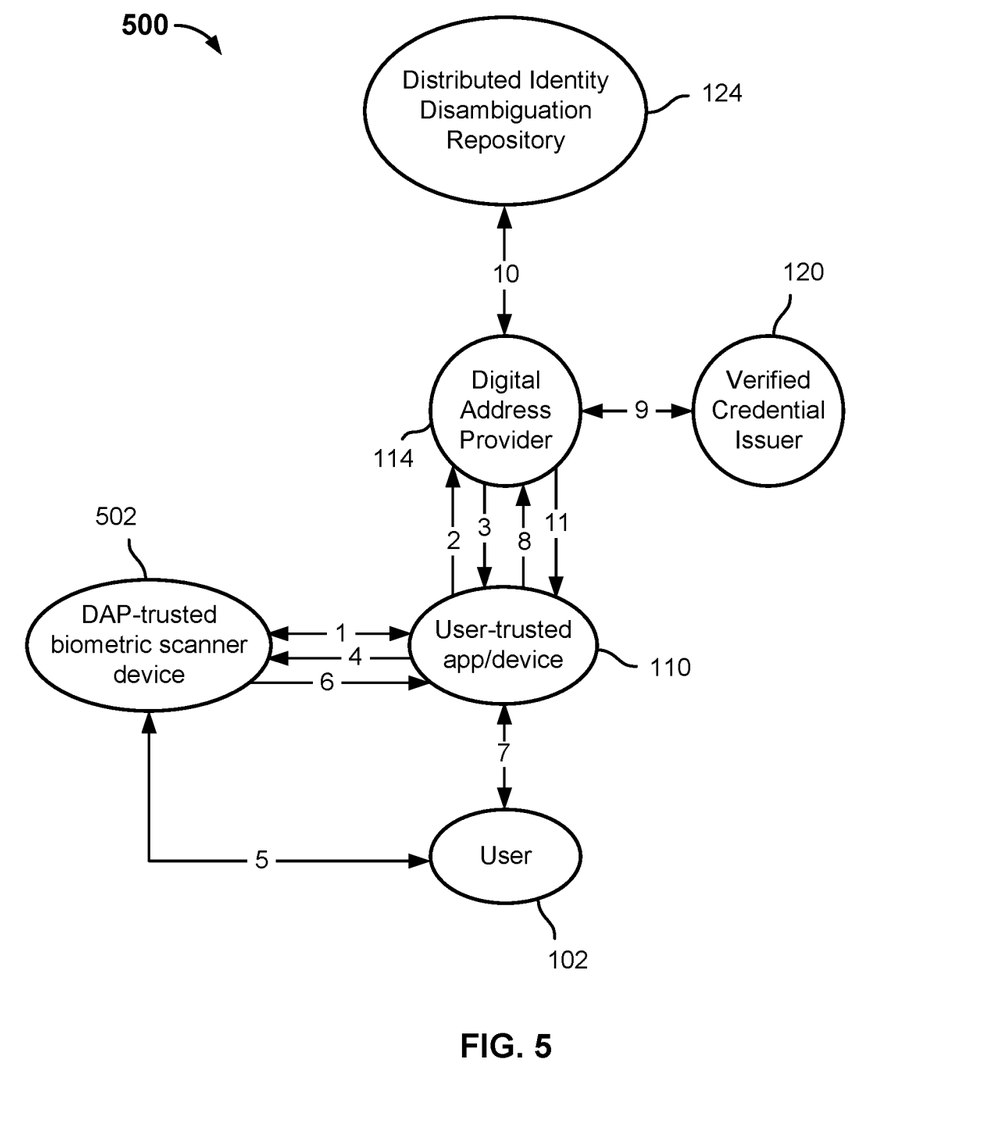
FIG. 5 is a functional flow block diagram illustrating an embodiment of a process to issue a digital address.

FIG. 5 is a functional flow block diagram illustrating an embodiment of a process to issue a digital address. In various embodiments, the process 500 of FIG. 5 produces an identity disambiguator while allowing the digital address provider to know that the identity disambiguator is correct and allowing the user to know that no biometric data was leaked to any party. In the example shown, the user 102 connects a digital address provider-trusted biometric scanner device 502 (e.g., a camera with a USB interface) to a user-trusted app/device 110 (e.g., a smart phone running an app capable of performing the required protocol with the scanner 502) (arrow "1"). In response to the scanner 502 being connected and/or some other prompt, the user-trusted app 110 sends a "registration start" message (arrow "2") to the digital address provider 114. The digital address provider 114 returns a randomly generated nonce to the user-trusted app/device 110 (arrow "3"), which passes the nonce to the scanner device 502 (arrow "4"). The scanner device 502 performs a biometric scan of the user (arrow "5") and uses the data obtained via the scan along with other attributes of the person to generate an identity disambiguator, as described above. The scanner device 502 in addition is used to scan the user's identification documents, and compares data extracted from the documents to data obtained via the scan. If any comparison fails, the transaction stops.

The scanner device 502 digitally signs a concatenation of the nonce (received via arrows "3" and "4", as described above), the identifying documentation (scanned in the previous step), and the identity disambiguator and returns it, along with the raw biometric scan data, to the user-trusted app/device 110 (arrow "6"). The user-trusted app/device 110 recomputes the identity disambiguator from the raw biometric data and verifies that the resultant identity disambiguator matches the one signed by the scanner device 502 (thus assuring that the identity disambiguator is correct and that no biometric information is being leaked). The user-trusted app/device 110 may interact with the user to generate its own version of biometric data (arrow "7"), e.g., to be compared to the corresponding raw data received from the scanner device 502.

The user-trusted app/device 110 sends to the digital address provider 114 (arrow "8") the digitally signed concatenation of the nonce, identifying documentation, and identity disambiguator received from the scanner device 502 (arrow "6"). The digital address provider 114 verifies the scanner device 502's signature on the concatenation of the nonce, identifying documentation, and identity disambiguator. If verification fails, the transaction stops. If the verification passes, the digital address provider 114 extracts information from the identity documentation and verifies it with the verified credential issuer 120 (arrow "9") and checks the distributed identity disambiguation repository 124 (arrow "10") to verify the identity disambiguator has not be registered previously. If not, the digital address provider 114 uses the identity disambiguator to generate a digital address for the user, which is returned to the user via the user-trusted app/device 110 (arrow "11"). If the digital address provider 114 determines via the distributed identity disambiguation repository 124 that the identity disambiguator has been registered previously, the response (arrow "11") indicates the registration process failed and, in some embodiments, provides instructions to recover the digital address registered by the user previously.

Figure 6A:
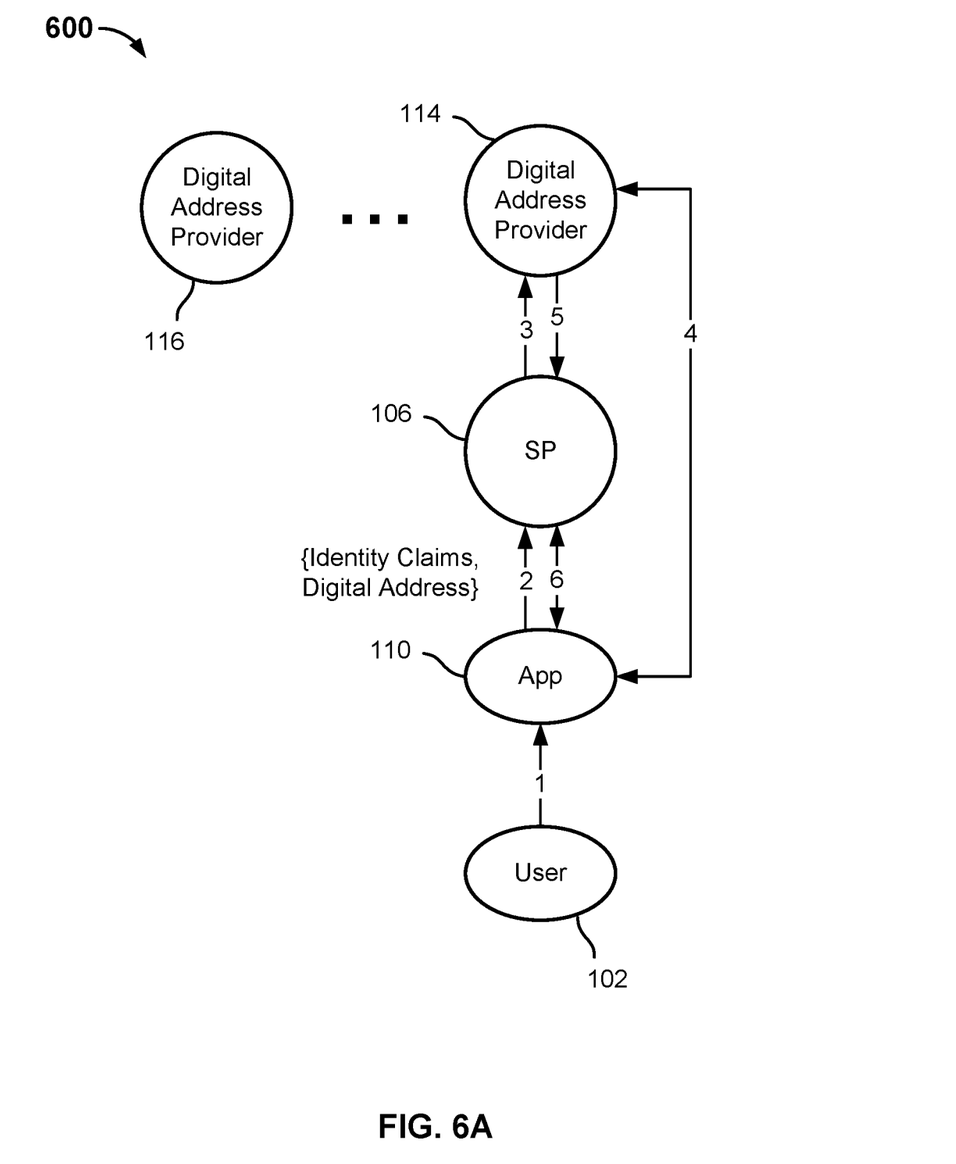
FIG. 6A is a functional flow block diagram illustrating an embodiment of a process to use a digital credential to verify a claim.

FIG. 6A is a functional flow block diagram illustrating an embodiment of a process to use a digital credential to verify a claim. In various embodiments, the process 600 of FIG. 6A may be implemented to enable a service provider, such as service provider 106 in the example shown, to use a digital address registered previously by a user, such as user 102, to provide access to a service based on identity claims presented by the user, for example by using the digital address provided by the user to verify the user's identity claims in real time.

In the example shown, the user 102 invokes (arrow "1") an app 110 to access a service provided by a service provider, such as service provider 106. The app 110 may be an app provided by and/or otherwise associated with and/or configured to access the service from service provider 106. The app 106 sends to the service provider 106 (arrow "2") data that includes one or more identity claims of the user 102 (e.g., name, address, last four digits of social security number or other identification number, etc.) and the digital address obtained previously by the user 102, e.g., via one or more of the processes illustrated in FIGS. 2 through 5.

The service provider uses the digital address to verify the identity claims with an associated digital address provider, e.g., digital address provider 114 in this example (arrow "3"). For example, the digital address may be associated with digital address provider 114, e.g., may include address and/or routing information that resolves to digital address provider 114. Or, in some embodiments, a digital address presented to any digital address provider participating in a system as disclosed herein, such as any digital address provider participating in a digital address provider layer or network, such as digital address provider layer 118 of FIG. 1, and the receiving digital address provider uses the address to locate the user's data for verification.

In the example shown, the digital address provider 114 interacts with the user 102 via out-of-band communications (arrow "4") to verify whether the user consents to its identity claims being verified by the service provider 106 via the digital address provider 114. If the user 102 consents (arrow "4"), the digital address provider 114 checks the identity claims received from the service provider 106 (arrow "3") against corresponding previously-stored and previously-verified identity information of the user 102 (e.g., previously-stored identity claim data associated with the user 102's digital address). If the data matches, the digital address provider 114 returns a response (arrow "6") indicating the identity claims are verified. If the data does not match or if the user 102 refuses to consent, then the response (arrow "5") indicates the verification failed. In some alternative embodiments, instead of checking the identity claims received from the service provider 106 against corresponding previously-stored and verified information of the user 102, the digital address provider 114 instead provides access to credentials that are derived from identity data of the user 102 (usually from a credential issuer). These credentials are capable of proving to the service provider 106 that an identity claim is true either by providing signed proof of the data itself or in a zero-knowledge way (a "provable" yes or no) that the service provider 106 can trust without actually needing to compare to the identity data itself.

Referring further to FIG. 6A, the service provider responds to the user (arrow "6") to provide the requested service, if the verification passed, or indicating the service cannot be provided in the event the verification failed.

In some embodiments, the process 600 of FIG. 6A may be used to provide via digital address provider 114, e.g., to service provider 106, a "zero knowledge" proof required by the service provider 114 to provide a service to user 102 via app 110. The user 102 may not provide an explicit and/or specific identity claim to the service provider 106, and instead may request a service that requires and implicitly prompts the service provider 106 to perform a zero knowledge verification. For example, to access a service available only to persons aged 21 or older, service provider 106 may be required to verify the user 102 meets the age requirement. Rather than require the user 102 to state their age (arrow "2"), the service provider 106 may simply require the user 102 to provide the user's digital address, which the service provider 106 then uses to ask the digital address provider 114 (arrow "3") to verify the user 102 is at least 21 years of age. The digital address provider 114 requests permission (arrow "4") from the user 102 to provide (arrow "5") the verifiable credential requested by the service provider 106 (i.e., verifying the user 102 is 21 years or older), which the service provider 106 then relies on to provide access to the service (arrow "6"). Note in the above example the user 102 never provides or is asked to provide the user's age, and the service provider 106 never has access to the user 102's precise age or date of birth.

Note that as illustrated in FIG. 1 and FIG. 6A, the digital address provider 114 is one of a plurality of digital address providers that also includes digital address provider 116 and other digital address providers. In various embodiments, a digital address as disclosed herein is used to route identity verification requests by service providers, such as service provider 106 in the example shown in FIG. 6A, to any digital address provider that participates in the digital address ecosystem as disclosed herein. In the example shown in FIG. 6A, the digital address presented by and associated with the user 102 has been used to route a verification request by service provider 106 to the digital address provider 114. In other examples, the verification request by service provider 106 may have been routed to the digital address provider 116, which would in various embodiments have been equally able to service the request, as disclosed herein.

Figure 6B:
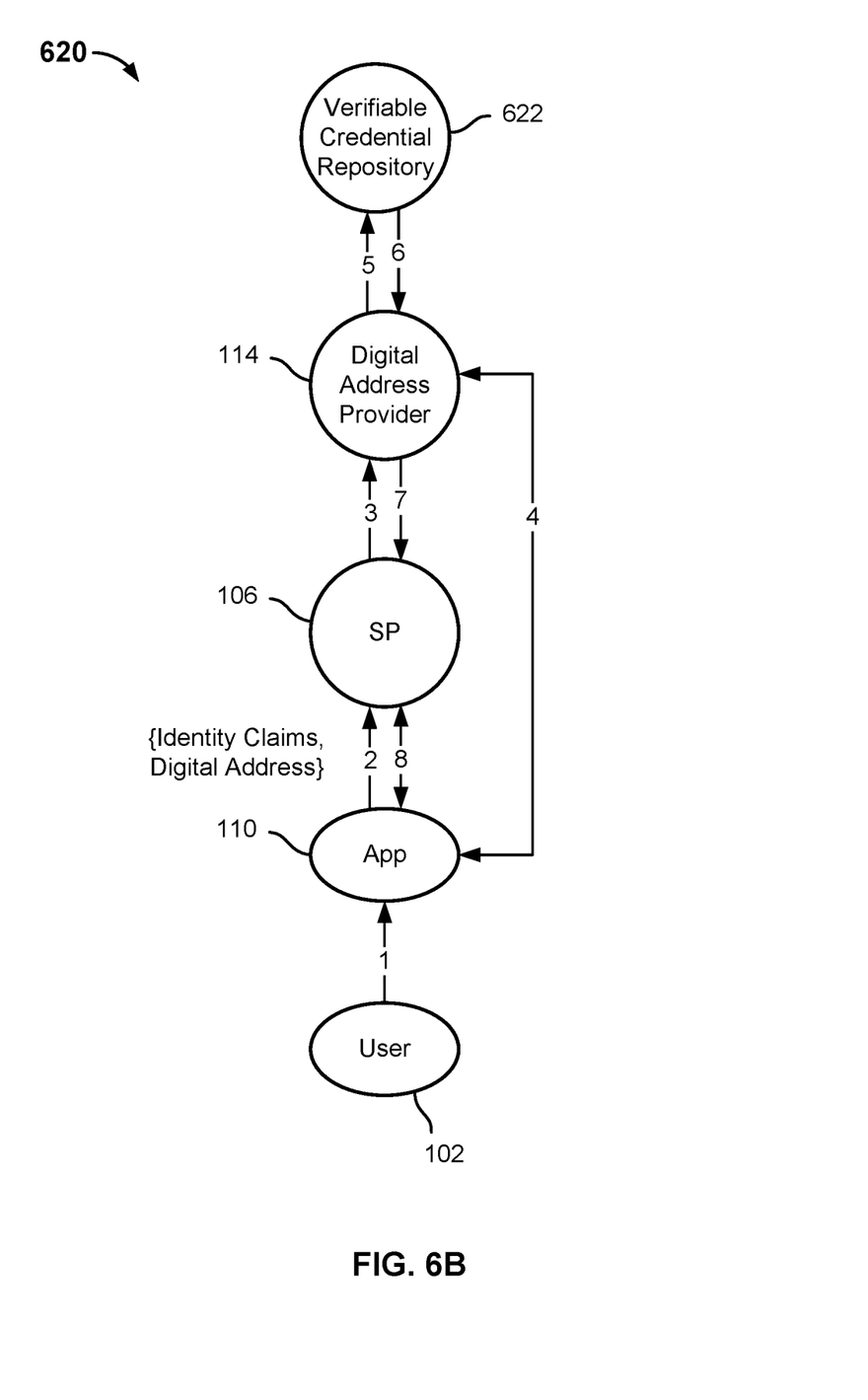
FIG. 6B is a functional flow block diagram illustrating an embodiment of a process to use a digital credential to verify a claim.

FIG. 6B is a functional flow block diagram illustrating an embodiment of a process to use a digital credential to verify a claim. In various embodiments, the process 620 of FIG. 6B may be implemented to enable a service provider, such as service provider 106 in the example shown, to use a digital address registered previously by a user, such as user 102, to provide access to a service based on identity claims presented by or otherwise associated with the user, for example by using the digital address provided by the user to verify the user's identity claims in real time.

In the example shown in FIG. 6B, the process 620 is similar to the process of FIG. 6A, except that the data against which the user's identity claims are verified is stored in a verifiable credential repository 622. Upon receiving a request from service provider 106 to verify a claim (arrow "3") and obtaining the user 102's permission to perform the verification (arrow "4"), the digital address provider 114 requests (arrow "5") and obtains (arrow "6") a verifiable credential corresponding to the request/identity claim, and returns the a verifiable presentation of the credential to the service provider 106 (arrow "7"). In various embodiments, the service provider 106 does not receive the credential itself, just a presentation of the credential that supplies the necessary proof of an identity claim. In some embodiments, the digital address provider 114 may perform the further step of verifying the (continued) validity of the verifiable credential received/obtained from verifiable credential repository 622 (arrows "5" and "6"), e.g., by querying an issuer of the verifiable credential.

In some embodiments, the verifiable credential obtained from verifiable credential repository 622 may be pre-verified, e.g., by a credential issuer and/or other entity associated with one or more of the verifiable credential (arrow "6") and the verifiable credential repository 622. In some embodiments, the verifiable credential (arrow "6") may be generated in real time, e.g., in response to the request for the verifiable credential (arrow "5"). For example, the verifiable credential may be generated based on other data that is stored by and/or obtained at request time by verifiable credential repository 622. In some embodiments, the verifiable credential repository 622 may be the same as, maintained by, and/or otherwise associated with a verified credential issuer, such as verified credential issuers 120, 122 of FIG. 1, and in some such embodiments the verifiable credential obtained from the verifiable credential repository 622 (arrows "5" and "6") may be generated and verified, implicitly or otherwise, by the verified credential issuer 120, 122, e.g., prior to sending the verifiable credential to the service provider 106 (arrow "6").

Figure 7:
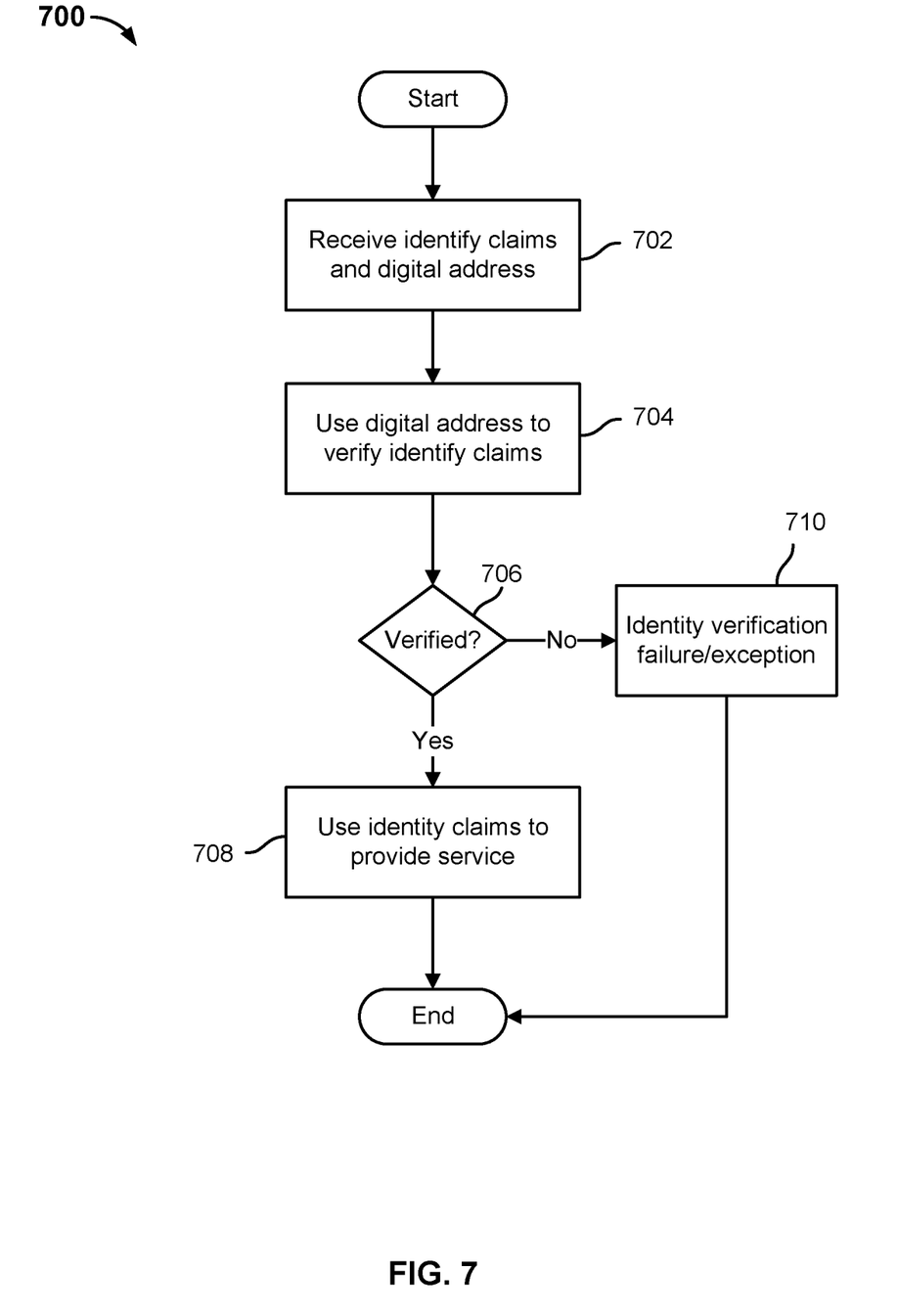
FIG. 7 is a flow diagram illustrating an embodiment of a process to use a digital credential to verify a claim.

FIG. 7 is a flow diagram illustrating an embodiment of a process to use a digital credential to verify a claim. In various embodiments, the process 700 of FIG. 7 is performed by a service provider, such as service provider 106 in the example shown in FIG. 6.

In the example shown, at 702 one or more identity claims and a digital address are received. At 704, the digital address is used to verify the identity claims, e.g., as described above in connection with FIG. 6. If the identity claims are verified (706), the identity claims are used at 708 to provide the requested service. For example, the identity claim data may be used to perform the service, or access to the service may be provided based on the user's identity and/or in a manner determined at least in part by the user's identity, as determined and verified via the identity claims. If the identity claims are not verified (706), then at 710 identity verification failure and/or exception processing is performed. For example, the user may be notified that the service cannot be provided due to identity verification failure.

In various embodiments, techniques disclosed herein may be used to provide secure access to services via a system that protects user biometric and other data from risk of disclosure; minimizes the risk of user data, credentials, and/or identity information being cloned or otherwise stolen; and ensures that each human user has and is able to obtain only one digital address and/or other digital identity and which ensure that each human user is the only user able to obtain that user's unique digital address and/or other digital identity.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface associated with a service provider; and
   a hardware processor associated with the service provider and coupled to the communication interface and configured to:
   receive from a user device via the communication interface a request comprising one or more identity claims and a digital address associated with a user of the user device, wherein the one or more identity claims include personal information associated with the user;

use the digital address to verify, via a verification node associated with a digital address provider, the one or more identity claims by providing the one or more identity claims to the digital address provider, wherein the digital address provider utilizes the verification node to check the personal information associated with the user included in the one or more identity claims against corresponding previously-stored and previously-verified identity information of the user, wherein the digital address provider generated the digital address for the user in response to determining that an identity disambiguator provided by a verified credential issuer has not been previously registered with the digital address provider, wherein the user provided information unique to the user to the verified credential issuer, wherein the identity disambiguator is based in part on the information unique to the user;

receive from the verification node associated with the digital address provider via communication interface a response indicating that the one or more identity claims have been verified; and provide access to a service, in response to the request, based at least in part on the response from the verification node indicating the one or more identity claims have been verified, wherein the verification node associated with the digital address provider is configured to obtain consent, in real time, from the user with which the digital address is associated, prior to providing said response indicating the one or more identity claims have been verified.

2. The system of claim 1, wherein the digital address provider comprises an issuer of the digital address.

3. The system of claim 1, wherein the digital address is issued by an entity other than the digital address provider.

4. The system of claim 1, wherein the verification node stores a verified record copy of data corresponding to the one or more identity claims.

5. The system of claim 4, wherein the verification node stores the verified record copy of data corresponding to the one or more identity claims in connection with issuance of the digital address.

6. The system of claim 5, wherein the verification node communicates with the verified credential issuer, in connection with issuance of the digital address, to verify the stored data corresponding to the one or more identity claims.

7. The system of claim 4, wherein the verified record copy is stored in or otherwise accessible to a verifiable credential repository and the processor is configured to use the digital address to obtain from the verifiable credential repository a verifiable credential associated with access to the service.

8. The system of claim 1, wherein the digital address is associated uniquely with a single human person with whom the one or more identity claims are associated.

9. A method, comprising:
receiving at a service provider from a user device a request comprising one or more identity claims and a digital address associated with a user of the user device, wherein the one or more identity claims include personal information associated with the user;

using the digital address to verify, via a verification node associated with a digital address provider, the one or more identity claims by providing the one or more identity claims to the digital address provider, wherein the digital address provider utilizes the verification node to check the personal information associated with the user included in the one or more identity claims against corresponding previously-stored and previously-verified identity information of the user, wherein the digital address provider generated the digital address for the user in response to determining that an identity disambiguator provided by a verified credential issuer has not been previously registered with the digital address provider, wherein the user provided information unique to the user to the verified credential issuer, wherein the identity disambiguator is based in part on the information unique to the user;

receiving at the service provider from the verification node associated with the digital address provider via communication interface a response indicating that the one or more identity claims have been verified; and providing by the service provider access to a service, in response to the request, based at least in part on the response from the verification node indicating the one or more identity claims have been verified, wherein the verification node is configured to obtain consent, in real time, from the user with which the digital address is associated, prior to providing said response indicating the one or more identity claims have been verified.

10. A computer program product embodied in a non-transitory computer readable medium, comprising computer instructions for:

receiving at a service provider from a user device a request comprising one or more identity claims and a digital address associated with a user of the user device, wherein the one or more identity claims include personal information associated with the user;

using the digital address to verify, via a verification node associated with a digital address provider, the one or more identity claims by providing the one or more identity claims to the digital address provider, wherein the digital address provider utilizes the verification node to check the personal information associated with the user included in the one or more identity claims against corresponding previously-stored and previously-verified identity information of the user, wherein the digital address provider generated the digital address for the user in response to determining that an identity disambiguator provided by a verified credential issuer has not been previously registered with the digital address provider, wherein the user provided information unique to the user to the verified credential issuer, wherein the identity disambiguator is based in part on the information unique to the user;

receiving at the service provider from the verification node associated with the digital address provider via communication interface a response indicating that the one or more identity claims have been verified; and providing by the service provider access to a service, in response to the request, based at least in part on the response from the verification node indicating the one or more identity claims have been verified, wherein the verification node is configured to obtain consent, in real time, from the user with which the digital address is associated, prior to providing said response indicating the one or more identity claims have been verified.

* * * * *